Inventors:
Floris Koppelmann,
Michael Häusler,
Detlef Knuth

BY Spencer & Kaye
Attorneys

Inventors:
Floris Koppelmann,
Michael Häusler,
Detlef Knuth

BY *Spencer & Kaye*
Attorneys 3,450,983
CIRCUIT FOR BALANCING AN UNSYMMETRICALLY LOADED POLYPHASE NET
Floris Koppelmann, Michael Hausler, and Detlef Knuth, Berlin, Germany, assignors to Licentia Patent-Verwaltungs-G.m.b.H., Frankfurt am Main, Germany
Filed Sept. 22, 1966, Ser. No. 581,342
Claims priority, application Germany, Sept. 22, 1965, L 51,685
Int. Cl. H03h 11/00, 1/00; H01g 1/16
U.S. Cl. 323—119          10 Claims

ABSTRACT OF THE DISCLOSURE

A polyphase reactive current rectifier circuit for balancing a polyphase net which is connected to an unsymmetrical load. The reactive current rectifier circuit is connected directly in parallel with the load and is operative to repeatedly connect a capacitor across individual phases of the net at the proper times to equally load each phase of the net.

---

The present invention relates to a reactive current rectifier for balancing the load in a polyphase net connected to single-phase or unsymmetrical polyphase inductive loads.

There exist reactive current amplifiers having capacitive storage means on the direct current side and reverse current rectifiers which, in contradistinction to reactive current rectifiers having inductive storage means, do not impress a symmetrical current but a symmetrical voltage on the net, that is to say, a step-shaped voltage which corresponds to the voltage of the storage means. Such reactive current rectifiers are generally suitable for balancing polyphase loads when the rectifiers can be connected directly in parallel with the load without the use of the customary input chokes. This is readily possible in the case of inductive loads. In order to prevent excessive harmonics from flowing in the polyphase net, the same can be connected to current-limiting reactances if the stray reactances of the voltage transformers and the like are not sufficient.

Under other circumstances, however, the conventional techniques can not be used, and it is, therefore, the primary object of the present invention to provide a load balancing reactive current rectifier which can be connected to the load without the use of input chokes. Accordingly, the present invention resides, basically, in a reactive current rectifier arrangement for balancing the load in a polyphase net connected to single-phase or unsymmetrical polyphase loads wherein, for the purpose of compensating for the reactive current and of balancing the load, a positively commutated three-phase reactive current rectifier having capacitive storage means and reverse current rectifiers is connected in parallel with the load without the use of chokes.

Additional objects and advantages of the present invention will become apparent upon consideration of the following description when taken in conjunction with the accompanying drawings in which.

Figure 1:
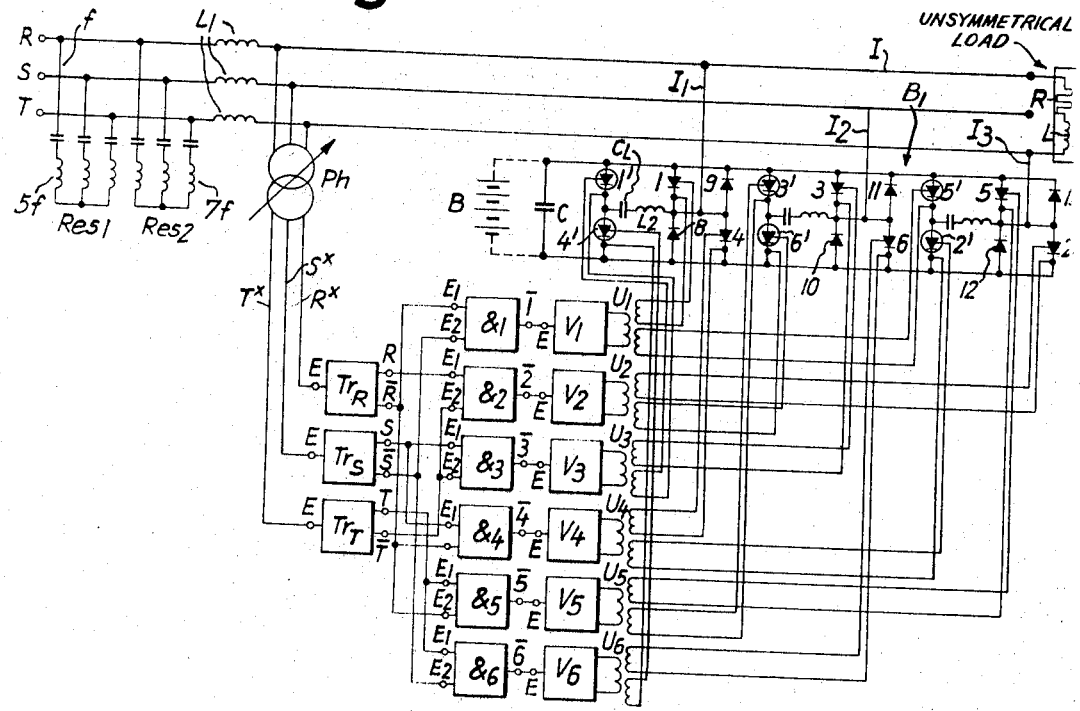
FIGURE 1 is a block circuit diagram of one embodiment of a load balancing rectifier arrangement according to the present invention.

Referring now to the drawings and first to FIGURE 1 thereof, the same shows a three-phase power supply net having phases R, S and T and operating at a frequency $f$, the net being connected to an unsymmetrical load such as an electric furnace whose ohmic and inductive components are shown at R and L, the load being connected across phases R and T. The current of the three-phase net is $I_0$ and the voltage is $\sqrt{3}\ V_0$. Each of the three phases incorporates a choke $L_1$ in order to protect the net from excessive harmonic currents. Connected in parallel with the load are a reactive current rectifier arrangement $B_1$ and a capacitive store such as a capacitor C. The currents flowing to the circuit $B_1$, C, are shown at $I_1$, $I_2$, $I_3$, current $I_2$ being the same as $I_0$, where $$I_0 = \frac{I \cos \phi}{\sqrt{3}}$$

The rectifier circuit $B_1$, being intended for the three-phase net R, S, T, is made up of six controllable power rectifiers 1, 2, 3, 4, 5, 6, six controllable turn-off rectifiers 1', 2', 3', 4', 5', 6', and six uncontrolled rectifiers or diodes 8, 9, 10, 11, 12, 13. The controllable power rectifiers differ from the controllable turn-off rectifiers only in their power rating. The former are arranged in the main current paths of the rectifier circuit $B_1$ while the latter function only to switch the relatively low power that flows from the energy stored in turn-off capacitors $C_L$. As is shown in FIGURE 1, each phase of the rectifier includes two of the controlled power rectifiers, two of the controlled turn-off rectifiers and two of the uncontrolled rectifiers, connected as follows, reference being had, by way of illustration, to the phase connected to R; a first series-circuit incorporates the controllable power rectifier 1 and the uncontrolled rectifier 8, and a second series-circuit incorporates the controllable power rectifier 4 and the uncontrolled rectifier 9. These two circuits are connected in parallel with each other in such a way that the rectifiers 1, 9 and 4, 8 are also in parallel with each other, this being so because the taps of the two series-circuits are connected to each other. The two controlled turn-off rectifiers 1', 4' form a third series-circuit which is connected in parallel with the first and second series-circuits. Each phase of the rectifier further includes a fourth series-circuit incorporating a turn-off capacitor $C_L$ and an inductance $L_2$ for positively commutating the power and turn-off rectifiers, this fourth series-circuit being connected between the tap of the third series-circuit 1', 4' and the connected-together taps of the first and second series-circuits 1, 8; 4, 9, with the tap of the series-circuit 1', 4', being connected to one plate of the capacitor $C_L$. Finally, each phase of the rectifier is connected, at the connected-together taps of the series-circuits 1, 8; 4, 9, to the respective phase line.

FIGURE 1 also shows the electronic firing circuit for controlling the twelve rectifiers. The three phases R, S, T, are connected via a phase shifter Ph which puts out steering signals $R^x$, $S^x$, $T^x$ to the inputs E of three trigger circuits $Tr_R$, $Tr_S$, $Tr_T$. The trigger signal $R^x$ produces two signals at the output of trigger circuit $Tr_R$, namely, the signal R and its negate or so-called complement $\overline{R}$, comparable signals S, $\overline{S}$, T, $\overline{T}$, being produced at the outputs of the other two trigger circuits $Tr_S$, $Tr_T$. The six output signals are applied to the inputs $E_1$, $E_2$, of six AND-circuits $\&_1$, $\&_2$, $\&_3$, $\&_4$, $\&_5$, $\&_6$, as shown in FIGURE 1, so that each of the resulting six logic functions represents the logic sum of one signal plus the complement of one of the other signals, i.e., the AND-circuits are connected to the outputs of the trigger circuits to produce the following logic functions:

$$\&_1 = R\&\overline{S}$$
$$\&_2 = R\&\overline{T}$$
$$\&_3 = S\&\overline{T}$$
$$\&_4 = S\&\overline{R}$$
$$\&_5 = T\&\overline{R}$$
$$\&_6 = T\&\overline{S}$$

The negated or complement outputs $\overline{1}$ to $\overline{6}$ of the AND-circuits are applied to the inputs E of six amplifiers $V_1$, $V_2$, $V_3$, $V_4$, $V_5$, $V_6$, as shown in FIGURE 1, the outputs of the amplifiers being connected to the primary windings of six respective transformers $U_1$, $U_2$, $U_3$, $U_4$, $U_5$, $U_6$, each of which has two separate secondary windings, one of which is connected to a power rectifier and the other of which is connected to a turn-off rectifier.

Inasmuch as the output pulses of the transformers are to be used both for power and turn-off rectifiers, the rectifier circuit is operated to meet the following criteria: when the power rectifier 1 is fired, the turn-off rectifier 5′ has to be fired, this being accomplished by having the two secondary windings of the transformer $U_1$ connected to the gate electrodes of these two rectifiers. Similarly, the power rectifier 2 and the turn-off rectifier 6′ are fired simultaneously (transformer $U_2$), as are the power rectifier 3 and the turn-off rectifier 1′ (transformer $U_3$), the power rectifier 4 and the turn-off rectifier 2′ (transfomer $U_4$), the power rectifier 5 and the turn-off rectifier 3′ (transformer $U_5$), and the power rectifier 6 and the turn-off rectifier 4′ (transformer $U_6$).

Figure 2:
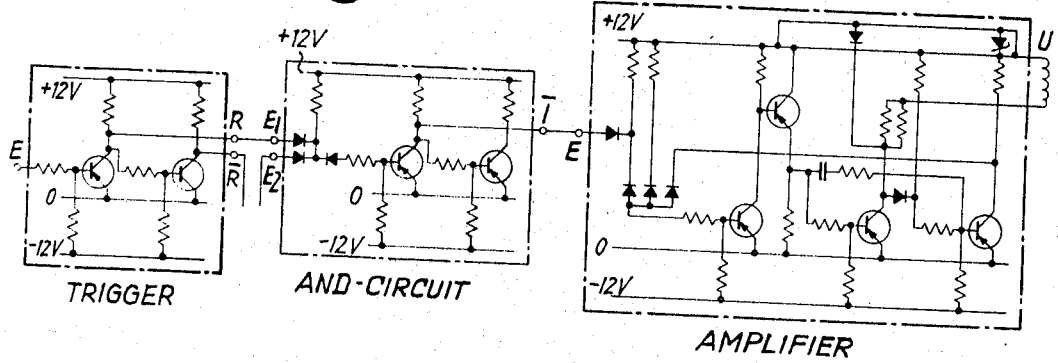
FIGURE 2 is a schematic circuit diagram showing in detail the make-up of the components forming part of the circuit depicted in FIGURE 1.

The three trigger circuits are of similar construction, as are the six AND-circuits and the six amplifiers; by way of illustration, the details of one of the trigger circuits of one of the AND-circuits, and of one of the amplifiers are shown in FIGURE 2. In practice, these circuits will use auxiliary potentials of −12 v., 0 and +12 v. The details of these circuits can, of course, be modified. Also, the pulses for the power and turn-off rectifiers can, instead of being derived from a common transformer, be taken from the positive output signal of the trigger via a serially connected capacitor and applied to the input of an AND-circuit, and a circuit analogous to that depicted in FIGURE 1 and made up of AND-circuits and amplifiers can be used for producing the pulses that control the turn-off rectifiers.

Figure 3:
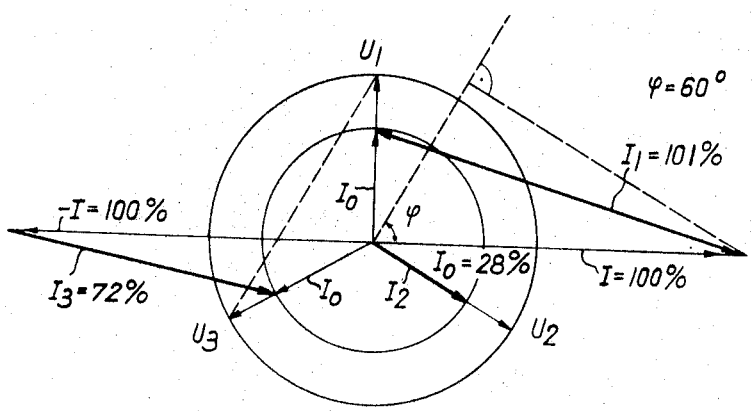
FIGURES 3 and 4 are vector diagrams showing the current and voltage relationship prevailing at different phase shifts.
Figure 4:
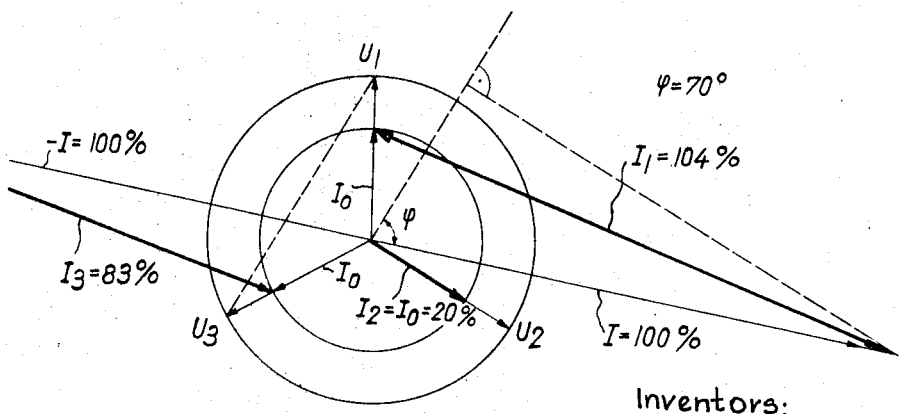

FIGURES 3 and 4 are vector diagrams, FIGURE 3 showing the relationship when the phase angle $\phi$ is 60° and FIGURE 4 the relationship when the phase angle $\phi$ is 70°, it being assumed that the internal resitsance of the reactive current rectifier is negligible and that steering angle $\delta$ is so selected that the current $I_0$ flowing to the rectifier from the supply net is symmetrical and purely ohmic. The reactive currents $I_1$, $I_2$, $I_3$ will then be as shown in the vector diagrams. Since, as already stated, $I_2 = I_0$, the current flowing in the phases $I_1$ and $I_3$ will be mainly the reactive current of the load.

One advantage of the circuit arrangement according to the present invention is that it makes it possible to balance the reactive current and to distribute the load symmetrically among the three phases of the three-phase net. Another advantage is that, due to the continuous, contactless—i.e., electronic—commutation, the reactive current rectifier is capable of automatically maintaining the system in balance and in symmetry despite rapid and irregular fluctuations in the load, provided the steering angle $\delta$ is symmetrical and regulated to produce the desired shift factor, for example, so that $\cos \phi = 1$.

If the net is to be kept practically completely free of harmonics, which may be formed due to the step-shaped reactive current rectifier voltages, suitable resonant filter circuits such as $Res_1$, $Res_2$, and so on, tuned to give harmonics such as $5f$ or $7f$, i.e., 300 or 420 c.p.s. where $f = 60$ c.p.s., can additionally be provided and connected on the net-side of the chokes $L_1$, thereby suppressing these harmonics.

If the load is a single-phase load, or if the load continually draws less current in one phase than in the others, those rectifier elements of the rectifier arrangement which lie in the less heavily loaded phases can be smaller than the rectifier elements used in the more heavily loaded phase. Under certain circumstances, as, for example, in the illustrated embodiment where $I_0 = I_2$ is a purely ohmic current, it will suffice if only reverse current rectifiers are used.

If, with the rectifier arrangement being controlled symmetrically, the currents $I_0$ do not become sufficiently symmetrical, the rectifiers of the three phases can be regulated nonsymmetrically in such a way that the currents $I_0$ are sufficiently symmetrical. Moreover, the symmetry can be improved still further by making the inductances of the chokes $L_1$ different from each other.

According to another feature of the present invention, a battery or fuel cell, shown symbolically, at B, can be connected in parallel with the storage capacitor C. The arrangement can then be used not only to insulate the net from reactive and ohmic currents, but the load can be continued to be operated despite breakdown of the main supply net.

The arrangement according to the present invention can be used throughout a wide frequency range, for example, between 16⅔ and 1000 c.p.s., so that the arrangement can be used to balance and to render symmetrical the load of middle-frequency generators. The power range extends from a few kvar. up to 100 mvar. In the case of smaller voltages, the rectifiers can be constituted by semiconductor elements, i.e., SCR's or so-called thyristors, while in the case of larger voltages, mercury vapor lamp-type rectifiers having short turn-off times may be used.

It will be understood that the above description of the present invention is susceptible to various modifications, changes, and adaptations.

What is claimed is:

1. A reactive current rectifier arrangement for balancing an unsymmetrical polyphase load connected to a polyphase net, comprising, in combination:
  (a) a polyphase reactive current rectifier circuit having capacitive storage means and controllable rectifiers and being connected directly in parallel with the load; and
  (b) a firing circuit connected to said rectifiers for controlling the same, thereby to positively commutate said rectifier circuit.

2. The combination defined in claim 1, further comprising reactance means arranged in the net at a point ahead of the parallelly connected load and rectifier circuit.

3. The combination defined in claim 2, further comprising filter means connected to the net, at a point ahead of said reactance means, for suppressing harmonics caused by said rectifier circuit.

4. The combination defined in claim 1 wherein the rectifiers in the least heavily loaded phases are smaller than those in the other phases.

5. The combination defined in claim 4 wherein the rectifiers in said least heavily loaded phases are solely reverse current rectifiers.

6. The combination defined in claim 1 wherein each phase of said rectifier circuit comprises:
  (i) a first series-circuit incorporating a controllable power rectifier and an uncontrolled rectifier,
  (ii) a second series-circuit incorporating a controllable power rectifier and an uncontrolled rectifier, said first and second series-circuits being connected in parallel with each other and having their taps connected to each other such that said power rectifier of said first series-circuit is connected in parallel with said uncontrolled rectifier of said second series-circuit and said controllable power rectifier of said second series-circuit is connected in parallel with said uncontrolled rectifier of said first-series circuit, (iii) a third series-circuit incorporating two controllable turn-off rectifiers and connected in parallel with said first and second series-circuits, (iv) a fourth series-circuit incorporating a capacitor and an inductance and connected between the tap of said third series-circuit and the connected-together taps of said first and second series-circuits, and (v) means connecting said connected-together taps of said first and second series-circuits to the respective phase line.

7. The combination defined in claim 6 wherein the polyphase net is a three-phase net, wherein said rectifier circuit has three phases whose controlled power rectifiers are designated (1, 4); (2, 5); (3, 6); respectively, and the controlled turn-off rectifiers associated with the respective power rectifiers are designated (1', 4'); (2', 5'); (3', 6'); respectively, and wherein said firing circuit comprises means for simultaneously firing said rectifiers in pairs as follows: (1, 5'); (2, 6'); (3, 1'); (4, 2'); (5, 3'); (6, 4').

8. The combination defined in claim 7 wherein said firing circuit means comprise:

(1) a phase shifter connected to the three phases for producing phase shifted steering signals $R^x$, $S^x$, $T^x$;

(2) three trigger circuits connected to receive said steering signals for producing complementary pairs of signals $R, \bar{R}; S, \bar{S}; T, \bar{T}$;

(3) six AND-circuits (&) for producing output signals in accordance with the following logic functions:

$\&_1 = R \& \bar{S}$
$\&_2 = R \& \bar{T}$
$\&_3 = S \& \bar{T}$
$\&_4 = S \& \bar{R}$
$\&_5 = T \& \bar{R}$
$\&_6 = T \& \bar{S}$ (4) means for applying said six output signals to said six pairs of controlled rectifiers, respectively.

9. The combination defined in claim 8 wherein said means defined in paragraph (4) comprise amplifiers.

10. The combination defined in claim 8 wherein said means defined in paragraph (4) comprise six output transformers each having two secondary windings connected, respectively, to the two rectifiers of the pair of rectifiers with which the respective transformer is associated.

References Cited

UNITED STATES PATENTS

| | | | |
|---|---|---|---|
| 3,040,230 | 6/1962 | Biringer | 321—7 |
| 3,054,940 | 9/1962 | Chergwin et al. | 321—69 |
| 3,099,784 | 7/1963 | Forsha et al. | 321—7 |
| 3,270,270 | 8/1966 | Yenisey | 321—18 |
| 3,295,045 | 12/1966 | Domizi | 321—7 |
| 3,332,008 | 7/1967 | Mueller et al. | 321—16 X |

JOHN F. COUCH, *Primary Examiner.*

G. GOLDBERG, *Assistant Examiner.*

U.S. Cl. X.R.

219—131; 307—93, 241; 323—124, 128